United States Patent [19]

Frear et al.

[11] Patent Number: 4,904,228
[45] Date of Patent: Feb. 27, 1990

[54] UNIVERSAL BALL JOINT

[75] Inventors: Lawrence Frear; John S. Davis, both of Sandy; Craig R. Hyland, Magna, all of Utah

[73] Assignee: Norton Christensen, Inc., Salt Lake City, Utah

[21] Appl. No.: 622,548

[22] Filed: Jun. 20, 1984

Related U.S. Application Data

[63] Continuation of Ser. No. 610,026, May 14, 1984, abandoned.

[51] Int. Cl.$^4$ ............................................. F16D 3/16
[52] U.S. Cl. ..................................... 464/152; 464/19
[58] Field of Search ................. 464/147, 150, 19, 152; 285/261, 266

[56] References Cited

U.S. PATENT DOCUMENTS

| | | | |
|---|---|---|---|
| 2,069,603 | 2/1937 | Earley | 464/19 X |
| 2,099,848 | 11/1937 | Grodhaus | 464/152 |
| 2,140,295 | 12/1938 | Mallard | 464/182 X |
| 2,197,991 | 4/1940 | Wright | 464/19 X |
| 2,680,358 | 6/1954 | Zublin | 464/19 |
| 3,454,288 | 7/1969 | Mancusi | 285/261 |
| 3,729,953 | 5/1973 | Wanzer | 464/152 |
| 3,731,500 | 5/1973 | Schlums | 464/152 |
| 3,732,706 | 5/1973 | Evans | 464/152 X |
| 3,733,853 | 5/1973 | Sutliff et al. | 464/19 |

Primary Examiner—Henry I. Recla
Attorney, Agent, or Firm—Arnold, White & Durkee

[57] ABSTRACT

An improved universal ball joint especially adapted to be used in the transmission of high torque, as in oil field use, includes a driving and driven shaft. One of the shafts, which may be the driving shaft includes a spherical ball received in a housing provided in the other shaft, which may be the driven shaft. The opposed surfaces of the ball and housing include axially extending grooves of essentially the same depth and length forming therebetween a plurality of chambers. Each chamber receives a pin which is tapered at each end and which forms the driving connection between the shafts. The shafts and the ball may include a bore for flow of fluid through the assembly, the ball being sealed in the ball chamber by seals to provide a sealed ball chamber which may be filled with lubricant, the ball being seated on a bearing and retained in the chamber by a retainer member which prevents relative axial movement between the shafts. Various forms are described including arrangements for flexible drill strings, reamer/stabilizer combination, mill tool combination and an arrangement for use in converting eccentric rotation to concentric rotation for use in a downhole motor.

26 Claims, 8 Drawing Sheets

UNIVERSAL BALL JOINT

This is a continuation of application Ser. No. 610,026, filed May 14, 1984, now abandoned.

FIELD OF INVENTION:

The present invention relates to universal ball joint structures and more particularly to an improved universal ball joint assembly capable of withstanding high torsional stress while transmitting high torsional torque.

DESCRIPTION OF THE PRIOR ART:

Universal ball joint structures are well known in the art and have been used in a variety of different applications in which a driving connection is made between two shaft structures in which one shaft drives the other and wherein there may be some misalignment between the two or where one shaft rotates eccentrically relative to the other. There are instances, however, in which the joint assembly must be capable of withstanding high torsional stresses while transmitting high torsional torque. One such typical application is in oil field tools in which flexible joints in the drill string or between components thereof may be needed for directional or slant drilling, for example. Another case is the connection between a motor section and the output shaft in a down hole motor assembly. In addition, since drilling fluid normally flows through the assembly, the ball joint structure must be capable of withstanding relatively high working pressures for example, 3,000 psi or more dynamic pressure and 10,000 psi static pressure. Torques as high as 19,000 ft./lbs. are not unreasonably high in oil field applications.

Another aspect of the oil field environment is that there is considerable weight on the down-hole components due to the weight of the drill string. Thus, in the normal case, there is little, if any, axial movement of the components of the drill string during normal use during a drilling operation. The result is that the components of the universal joint normally are not free to move axially relative to each other and the total joint assembly must be capable of achieving the necessary universal movement without the need for axial displacement of the components to achieve that universal freedom of movement.

Various U.S. patents describe flexible joints for use in oil field types of equipment, see for example, U.S. Pat. Nos. 1,886,820; 2,069,603; 2,680,005; 2,687,024; 2,712,436 and 4,263,788. It is also from the prior art to use a ball element with slots in the ball and ball elements to interconnect the driving and driven element, see for example, U.S. Pat. No. 2,140,295. Self aligning couplings are known as well, for example that of U.S. Pat. No. 2,940,786. Typically, universal ball joints may use a transverse shaft to interconnect the ball element to its cooperating structure, as shown in U.S. Pat. No. 3,176,805. The above prior art devices are either complex in structure or are such that there is a limited ability to operate satisfactorily in systems involving high torque. Virtually, any device that uses a pin or transverse shaft is essentially limited in torque to the strength of the shaft and the structure which cooperates with the shaft. To provide the necessary structure for high torque use, the components of the device tend to be rather bulky and large.

One of the prior art structures, used as a shaft coupling, uses cylindrical roller bearings received in axially extending slots in cooperating housings to interconnect the housings together The housings, in turn, are connected to the respective shafts by a key. In this arrangement, described in U.S. Pat. 3,729,953, the cooperating housings must be moved axially relative to each other so that the tapered cylindrical bearings permit limited displacement of the shafts relative to each other. Further, the housing is not a spherical ball element and, therefore, the housings and the shafts must move axially in order to provide sufficient clearance between the housings to permit limited displacement of the shafts relative to each other. The use of a key connection from the shaft to the housing also limits the ability of the structure to be used in high torque systems.

From the above, it becomes clear that it is desirable to provide a universal joint structure capable of reliable use in high torque systems and wherein the ability of the driving and driven components to articulate relative to each other is not dependent upon relative axial movement of the components constituting the universal joint.

It is also desirable to provide a universal ball joint which is capable of use in a drilling environment wherein high operating pressures are routine and wherein the weights on the universal joint may be substantial.

SUMMARY OF THE INVENTION

The present invention relates to a universal ball joint assembly and more particularly to a significantly improved universal ball joint assembly for use in arrangements in which there is a high torque. The structure of this invention is especially well suited for use in drilling equipment such as oil and gas drilling equipment.

Thus, the universal ball joint of this invention may be used virtually anywhere in the drill string as a torsional articulated joint. The described joint of this invention may be used in pairs, for example, as a universal ball joint system for down-hole motors of various types well known in the drilling art. It may also be used as the articulated joint in a series of string collars in the drill string since the universal joint of this invention is capable of operating under substantial working pressures. It may be used as the articulated joint between the drill string and a window cutting mill as is used in drainhole drilling or other operations in which mill is used to cut through a well casing. Various types of devices may be attached to the driven output shaft of the universal joint, such as a stabilizer or a drilling tool. In effect, the universal ball joint of this invention may be used in any arrangement which requires or in which it is expected that there may be articulation between adjacent driving and driven members and may be used where it is necessary to have drilling fluid flow through the joint, or where fluid forms around the outer periphery of the joint.

The universal ball joint of this invention includes two shaft members, which may be solid or hollow, and which are axially fixed in the sense that the shafts do not move axially with respect to each other. The first shaft includes a spherical ball at one end thereof which is received within a housing provided by the other shaft. The outer surface of the ball includes a plurality of axially extending grooves while the wall of the receptacle facing the ball likewise includes a plurality of axially extending grooves which cooperate with those in the ball to form a plurality of axially extending chambers. The chambers are evenly spaced radially. Each of the chambers includes a pin which forms a driving connection between the two shafts. Each pin is generally cylindrical in shape and of a length approximately equal to the axial length of the chamber. Each end of the pin is tapered the same amount at the ends with the center portion of the pin being on a large radius rather than being flat. The taper on the pins is preferably ½ the angle traversed by the universal joint.

The lower end of the housing includes a seal/bearing assembly where fluid is passed, or only a bearing when fluid is not passed, while the ball element is contrained within the receptable by a ball retainer which prevents axial movement of the ball relative to the receptable. The ball retainer may include a seal for confining lubricant. The internal wall of the retainer may have a conical profile which limits the angular movement of the drive shaft so as to protect the ball drive assembly.

In one form of the present invention, a bore is provided in each of the driving and driven members so that drilling fluid or other fluid may be dumped through the articulated joint. In another form of the invention, no bore is provided and the driving and driven members are, in effect, solid shafts.

In certain cases, as will be described, a pair of universal ball joints of the present invention may be used in series. In that instance, the drive shaft to which the ball is attached may, in one case, be the driven shaft and in the other may be the driving shaft.

As will be apparent from the following detailed description, the universal ball joint of this invention has many advantages over the prior art universal joints as will be apparent to those skilled in the art. The following detailed description, with reference to the accompanying drawings, are for the purposes of illustrating the principles of this invention; but it is to be understood that such detailed description is not to be taken in a limiting sense, since the scope of the present invention is as set forth in the appended claims.

Figure 1:
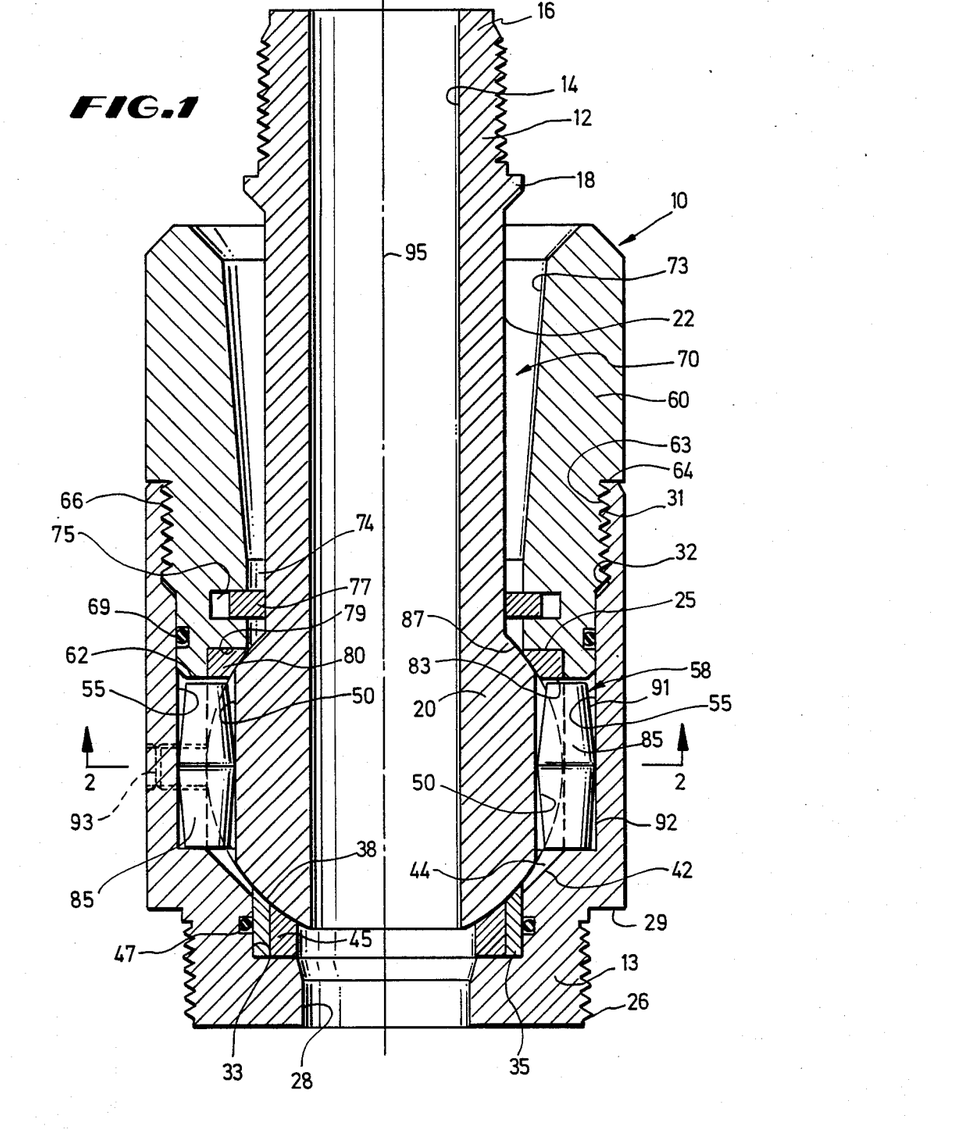
FIG. 1 is a view, partly in section and partly in elevation, of one form of the universal ball joint of the present invention.

DETAILED DESCRIPTION OF THE PREFERRED EMBODIMENTS:

Referring to the drawings which illustrate forms of the preferred embodiment of the present invention, FIG. 1 shows a universal ball joint assembly generally designated 10 which includes shaft members 12 and 13. In this form, the shaft 12 may include a bore 14, as shown, the end of the end 16 of the shaft 12 being threaded above a collar 18.

One end of the shaft includes a spherical ball element 20 which is preferably formed integrally on the shaft 12 whose outer surface 22, between the shoulder 18 and ball 20, is preferably cylindrical. The ball 20 is received within a housing 25 which is provided in the shaft 13, the end of which may be threaded as shown at 26, shaft 13 including a bore 28. The portion of the shaft 13 above the threads 26 includes a shoulder 29 which forms a butting surface for whatever is attached to the end of shaft 13. The upper end of the shaft 13 is threaded, as at 31, the threads terminating in an inclined shoulder 32.

Between the housing 25 and the lower end of the shaft 13 a bearing and seal cavity 33 is provided, the cavity being circular in shape and of a diameter larger than that of the bores of the shafts 12 and 13. A bearing element 35 is received in the cavity, the bearing being annular and including an upper inwardly inclined face 38 which matches the outer contour of the outer surface of the ball 20. As shown, the axial dimension of the bearing, which may be bronze, for example, is sufficient to maintain the lower surface of the ball spaced from the lower wall 42 of the housing 25 as shown at 44. Cooperating with the bearing 35 is an annular seal element 45 whose upper surface is contoured to match the contour of the ball and whose axial dimension is such that the seal element is compressed in a generally axial direction by the ball 20, the bearing also acting as an anti-extrusion device for the seal. As shown, the inner diameter of the seal, which may be molybdenum disulfide filled polyurethane, for example, is greater than the diameter of the bore in the ball so that the outer surface of the ball is always in contact with the seal face regardless of the orientation of the ball. The bearing 35 is sealed to the housing by a seal element 47, in the form of an o-ring groove, as shown.

The outer peripheral surface of the ball 20 includes a plurality of axially extending slots 50 (see also FIG. 2) in the form of right cylindrical grooves which are evenly spaced radially. The opposed surface 52 of the housing 20 also includes a plurality of axially extending slots 55 again in the form of right cylindrical grooves, equal in number to slots 50 and whose location aligns axially and radially with slots 50 to form between the opposed surfaces thereof a plurality of axially extending cylindrical chambers generally designated as 58, see FIG. 2. Cooperating with the shaft 12 is a retainer member 60 which includes a lower end face 62 which effectively forms the upper closure of the chambers formed by the axial slots in the ball and housing.

The retainer member includes an outer threaded portion 63, which receives the threaded end 66 of the shaft. Below the threaded portion of the retainer there is a seal element 69, in the form of an o-ring, received in a groove to provide a seal between the retainer and the shaft. The retainer includes a bore generally indicated at 70 whose inner surface is conical, as at 73, and whose lower end 74 is cylindrical. The cylindrical surface of the bore 70 includes inner circumferential slot 75 which receives a seal element 77, the latter being movable radially as the shaft articulates relative to shaft 13 in order to provide a seal between the retainer and the associated shaft in essentially all relative positions of the shafts with respect to each other. The retainer may be split to accommodate a threaded connection larger than the retainer bore. The lower end face 62 of the retainer is provided with an inner circumferential bearing pocket 79 which receives a bearing element 80, generally annular in shape and generally triangular in cross section. The bearing, which may be of bronze, includes a planar lower face 83 spaced from the top of pin elements 85 received in the axial chambers 58. The bearing also includes an inclined face 87, the upper portion of which bears against the opposed upper surface of the ball to keep the latter and the shaft 12 in axially fixed position relative to shaft 13.

Figures 2, 3, 4:
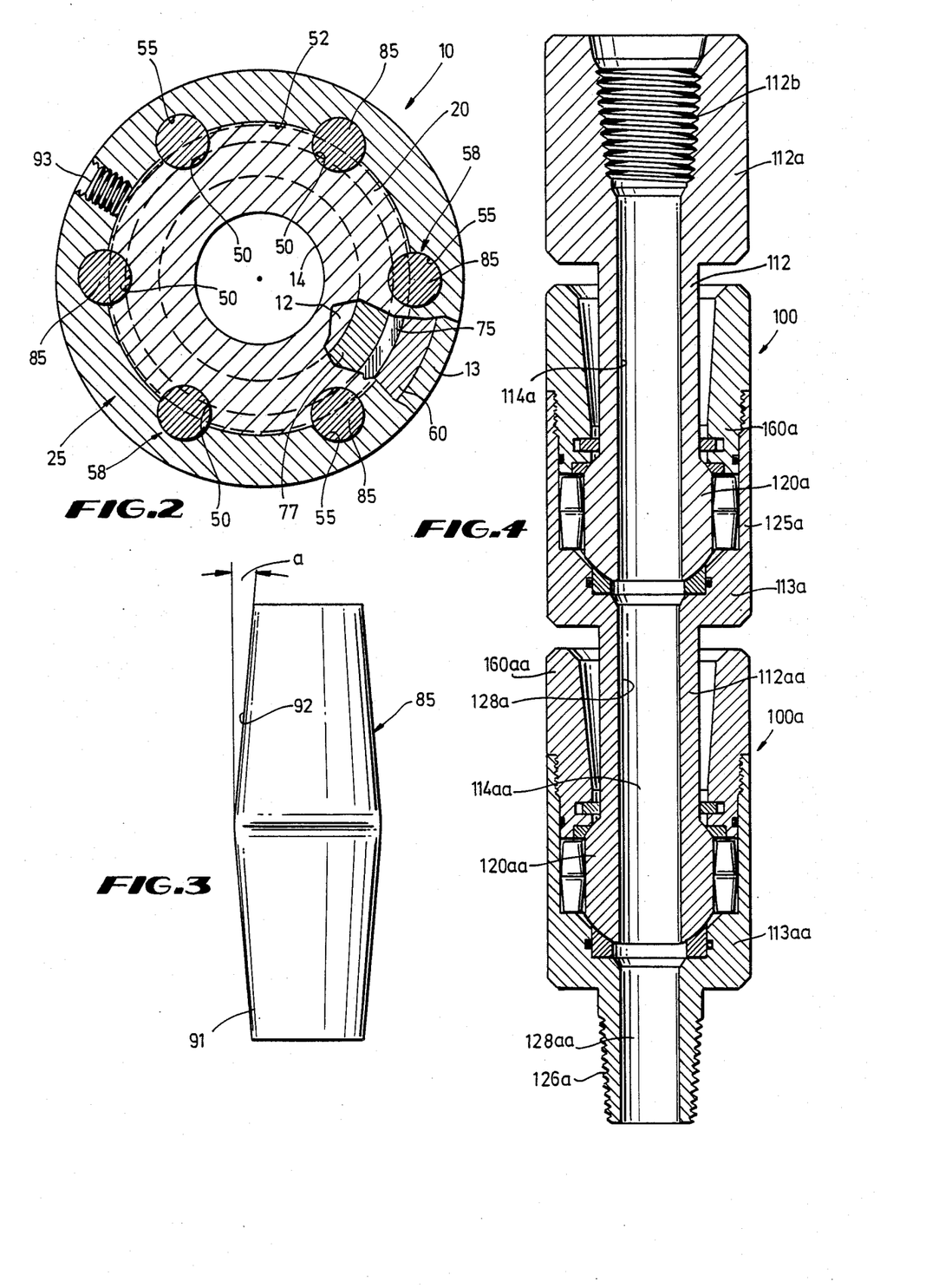
FIG. 2 is a view in section taken along the line 2—2 of FIG. 1.
FIG. 3 is an enlarged view, in perspective, of the pin element used in the universal ball joint of the present invention.
FIG. 4 is a diagrammatic view of the universal ball joint of the present invention in the form of an articulated joint for use in a drill string.

As shown in FIGS. 1 and 3, the pin element are generally cylindrical in shape, except that each end is linearly tapered as at 91 and 92 to form frusto-conical end portions. The mid-section of the pin is radiused on a large radius for reasons which will be explained. The linear taper on the ends of the pins, as measured between the outer tapered surface and a line at the midpoint parallel to the axis (angle a of FIG. 3) is ½ the angle traversed by the universal joint. Thus, if it is desired to have 8 degrees of movement relative to the center axis 95 of the assembly in the neutral position, the taper on the pins is 4 degrees. The taper on the conical section of the retainer bore is preferably less than the maximum angular deflection of the drive shaft. Thus, if the drive shaft is free to move 8 degrees from center, the conical surface is tapered at 7 degrees to prevent damage. Seals 45 and 77 effectively seal ball element and the pins in a sealed chamber which may be filled with lubricant through a fitting 93, the lower seal 45 also operating to prevent passage of fluid from the bores 14 and 28 into the sealed ball chamber.

In operation, as the shaft 12 is rotated, rotary movement is imparted to shaft 13 through the pins 85 received in the pin chambers 28. In effect, the portion of the pins received in the grooves 50 is driven by the ball while the portion of the pins in the groove 52 of the housing drives the housing and shaft 13. If the shaft 12 deflects to the left as seen in FIG. 1 then the ball pivots in the housing causing the top of the left pin to pivot into top of the groove in the housing while the lower end of the left pin is pivoted into the corresponding groove in the ball. The exact opposite movements are simultaneously taking place in the pin on the right side. The remaining pins also operate in pairs and the amount and extent of movement is related to the amount and direction of relative movement between the ball and the housing. It can thus be seen that the purpose of the large radius on the center section of the pins is to provide a high degree of compliance with the corresponding groove. In this way there is an exceptional driving connection between the pins and the housing and the ball which permits the assembly to transmit relatively high torques regardless of the relative angular position of the shafts.

It has also been observed that the pins tend to rotate during use as well as to float a small amount in an axial direction with the result that the pins tend to wear evenly. For this reason, it is preferred that the pins be of a material not as hard as that of the ball and housing so that the pins wear before the ball and housing wear. Maintenance of the assembly is thus relatively simple and usually involves replacing the pins. Further, if for any reason there is a loss of lubricant, it is preferred that the pins wear rather than the grooves in which they are received.

In the form illustrated as FIG. 1, the shaft may be connected to virtually any source of power such as a drill string and the like, while shaft 13 may be connected to drive a component. While shaft 12 has been referred to as the driving shaft and shaft 13 as the driven shaft, such reference was for ease of explanation since either shaft may be the driven or driving shaft. Again the term "shaft" has been used for ease of explanation, it being understood that various other mechanisms may be used. Thus, the term shaft is used in a broad sense.

Referring now to FIG. 4, another form of the present invention is shown in which the present invention is used as a universal ball joint for flexible tubular elements 100 adapted to be used in drilling applications. The details of the universal ball joint are as described in connection with FIGS. 1–3 above and FIG. 4 is a somewhat diagrammatic illustration. For ease of explanation corresponding reference numbers in the 100 series will be used.

Here the shaft 112 includes an upper section 112a having a box connection 112b, the ball 120a being received in the housing 125a with its associated retainer 160a. The details of the retainer, ball, pins, pin chambers, seals and bearings are as previously described. The shaft 112 and the ball 120a include a bore 114a communicating with a bore 128a of shaft 113a. Here however, the shaft 113a is preferably integral with shaft 112aa of the lower universal ball joint assembly 100a. The lower assembly 100a also includes a driven shaft 113aa having a pin connection 126a for connection to a box joint. Again, the details of the retainer 160aa, ball 120aa, pins, pin chamber, seals and bearings for universal ball joint 100a are as previously described. Again, bore 114aa and communicating bore 128aa are present although bores 128a and 114aa are the same bore, while shaft 113a and 112aa are the same shaft.

In this form, shaft 112 is driven to cause rotation of shaft 113a of the assembly 100, but since shaft 113a is common to shaft 112aa, the latter forming the driving connection to assembly 100a, the shaft 113a–112aa is both a driven shaft for one assembly and the driving shaft for another assembly. Shaft 113aa is the driven shaft of assembly 100a. This particular arrangement of universal ball joint assemblies 100 and 100a has all of the advantages of the assembly of FIG. 1, but may be used in the situations in which it is desired to provide flexible tubulars, capable of carrying fluid, which are torsionally driven and are pressure tight. Typical such uses are in slant drilling, deviation drilling and drainhole drilling and the like. It will be apparent that the box and pin connections may be reversed, and any number of multiples of the assembly may be used depending upon the flexibility needed.

Figure 5:
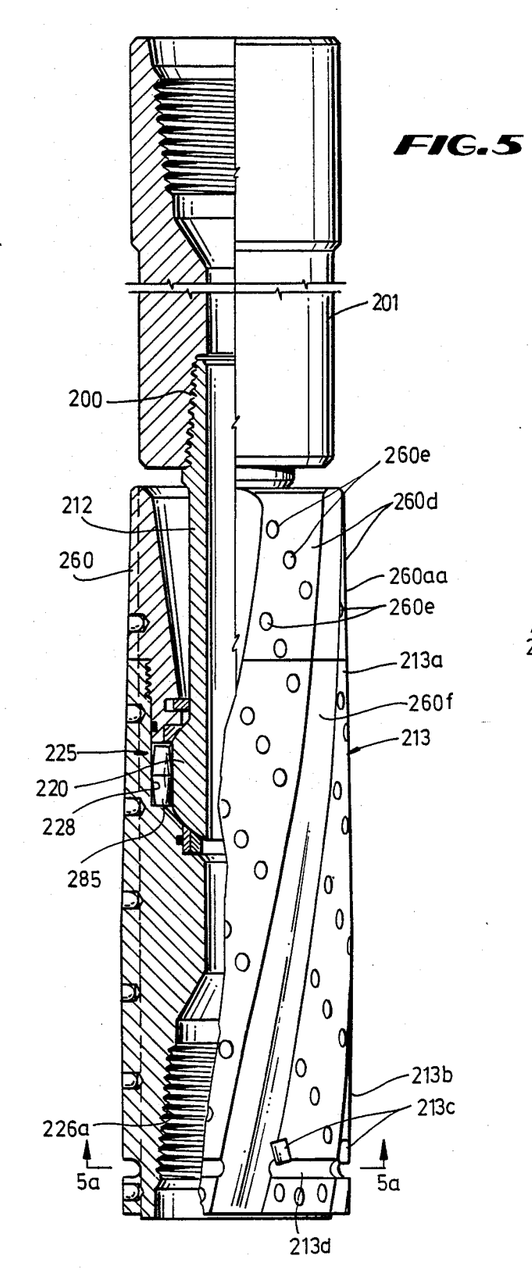
FIG. 5 is a view, partly in section and partly in elevation, of one form of the universal ball joint of this invention illustrated as the connection between a drill string and a reamer/stabilizer assembly.

FIG. 5 illustrates another form of the present invention in which the universal ball joint of this invention is incorporated into a reamer/stabilizer assembly. As shown, the assembly is attached by a threaded connection 200 to the lower end of a drill string 201. The details of the universal ball joint are basically as shown and described in connection with FIG. 1 and thus reference numerals in the 200 series will be used. The shaft 212 and the ball 200 are as previously described. In order to protect the system, the threaded connection 200 is weaker in tension and torsion than the remaining system. The retainer 260, the pins 285 and the pin chambers 228 and the bearing and seal assemblies are as previously described.

Figure 5A:
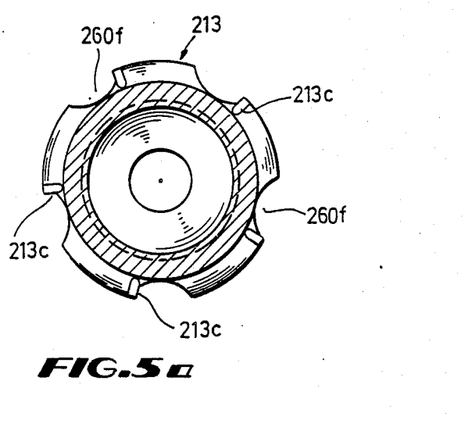
FIG. 5a is a view in section, taken along the line 5a—5a of FIG. 5.

In this particular form of the invention, the shaft 13 is in the form of a reamer/stabilizer 213, the upper portion 213a being the stabilizer section and the lower end 213b being the reamer section. The stabilizer section 213a includes the housing 225 which receives the ball element 220 and the outer surface of the stabilizer section is tapered inwardly as shown. In substance, the retainer 260 forms part of the stabilizer 213, the outer surface 260aa thereof including a plurality of spaced spiral pads 260d, each of which includes tungsten carbide inserts 260e, adjacent pads being separated by spiral grooves 260f. In assembling the tool, the retainer 260 is tightened such that the pads and grooves line up with those on the shaft 213a. The lower end of the assembly includes a plurality of cutting elements 213c arranged around the periphery (see FIG. 5a). The cutting elements may be polycrystal compact cutters, for example. As shown in FIG. 5a, the cutters 213c are located at the junction of the pad and groove, while an annular groove 213d is located below the cutters to collect the cuttings. The lower end of the reamer section is internally threaded at 226a for attachment to another component, for example, a drill bit, not shown.

The provision of an articulated reamer/stabilizer using the universal ball joint of this invention offers the advantage of an articulated composite tool having a bore through the center for flow of fluid and having all the desirable qualities of the universal ball joint of this invention, i.e., high torque transmitting character.

Figures 6, 7:
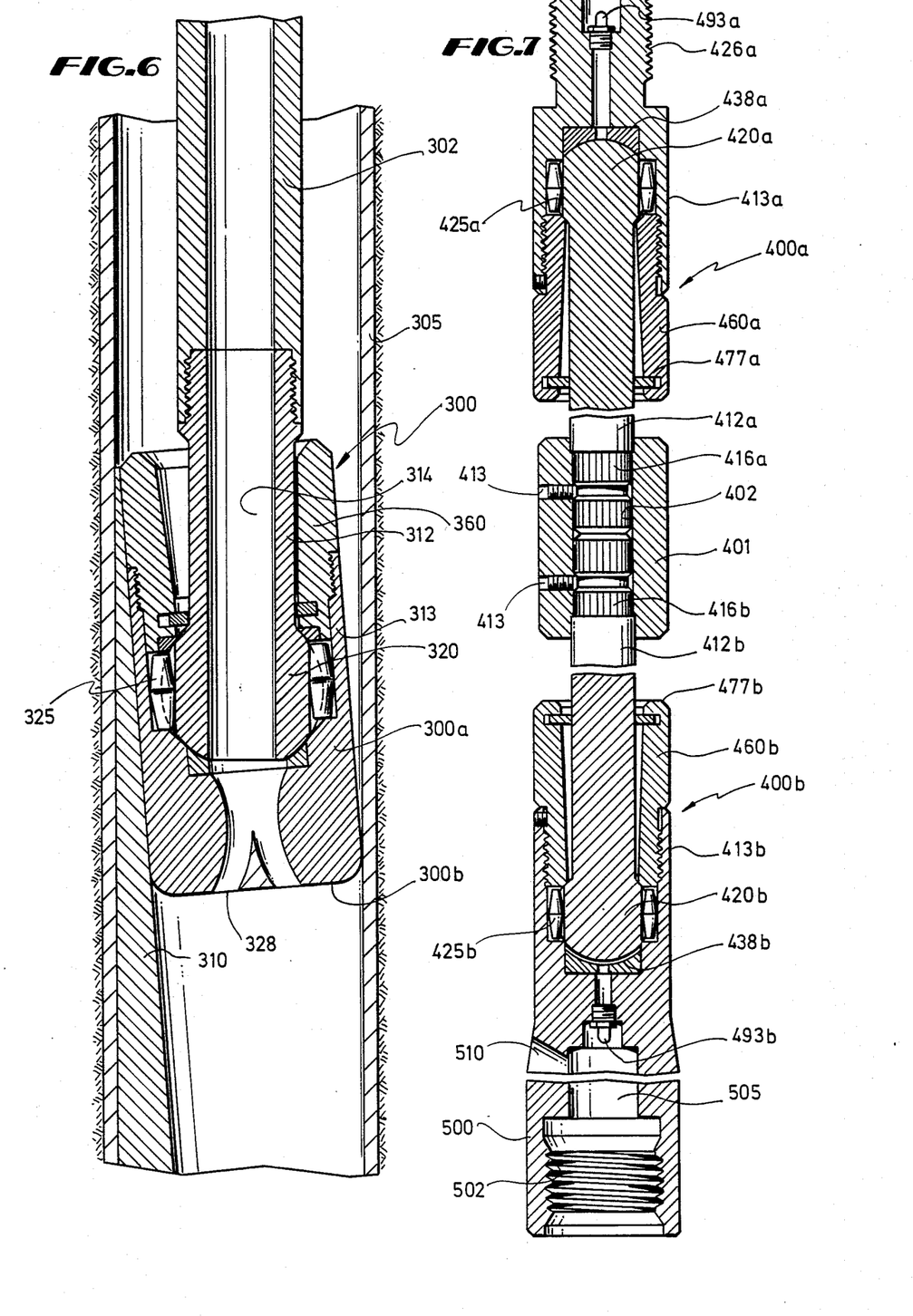
FIG. 6 is a diagrammatic illustration of the ball joint of this invention connected to a window cutting mill.
FIG. 7 is a view, partly in section and partly in elevation, of another form of the universal ball joint of the present invention for use as the interconnection between non-aligned shafts to allow conversion of eccentric rotation to concentric rotation.

The form of assembly illustrated diagrammatically in FIG. 6, and embodying the universal ball joint of this invention, is shown in the form of a flexible or articulated window mill assembly 300. The assembly 300 is shown mounted on a drill string 302 positioned in a bore cased with a ferrous bore casing 305, for example. Also located in the bore is a whipstock or wedge 310 the latter positioned and supported by any of the systems well known in the art.

Again, the details of the universal ball joint are as previously described in connection with FIG. 1 and for ease of understanding the 300 series of reference numerals will be used. The shaft 312 of the ball joint is treaded to the drill string 302, the shaft including a bore 314 which extends through the ball element 320. The window mill 300a itself is composed of the retainer 360 which is received by the shaft 313, the retainer and shaft forming the body of the mill tool 300a. The housing 325 is of the structure previously described as are the pins, pin chambers, seals and bearings. The mill 300a includes no cutting elements on the outer face or gage which thus keeps the mill tool in a bearing relation with the whipstock 310. The mill tool includes a cutting face 300b and a fluid passage 328 therethrough communicating with passage 314. By placing the universal joint close to the bit face, the ball joint redirects the applied loads to insure that the mill cuts parallel to the whipstock face rather than into the whipstock and that the forces required to effect the cutting action are directed perpendicular to the face of the mill. Further, the mill or the cutting tool is prevented from leaving the whipstock prematurely and leaving a lip on the bottom of the cut. As in the reamer/stabilizer system, the shaft is in effect an articulated tool element positioned quite close to the ball joint.

Another form of the present invention is shown in FIG. 7 and this structure is particularly adapted for use in the conversion of eccentric rotary motion to concentric motion and may be used, for example, to connect a motor shaft of a down-hole motor to the output shaft to drive a drill bit. In this form two universal ball joint assemblies 400a and 400b are interconnected by a coupling 401 which is threaded at 402 and which receives the threaded ends 416a and 416b of the shafts 412a and 412b, the connection being held by lock screws 403. In this form, the shafts 412a and 412b are solid, although they may include a bore if desired. Each shaft includes a ball element 420a and 420b, each of which may be solid, as shown. Associated with each of the shafts 412a and 412b is another shaft 413a and 413b, each of which includes a housing 425a and 425b. Each of the housings and balls includes pin chambers, as described, and pins received in the chambers, as described. Cooperating with the shafts 413a and 413b is a retainer 460a and 460b, each of which is of a structure essentially as already described. Cooperating with each ball element and received in each housing is a nose bearing 438a and 438b each of which cooperates with seals 477a and 477b, previously described, to form a sealed ball chamber and to support the ball.

Shaft 413a includes a threaded end 426a for connection to a mating part and includes a grease fitting 493a to lubricate the ball chamber. Shaft 413b likewise includes a grease fitting 493b for lubrication. The end of shaft 413b is in the form of a bonnet 500, internally threaded as at 502 for connection. The bonnet includes a hollow portion 505 and a passageway 510 through the bonnet wall for flow of fluid.

As can be appreciated, the structure at FIG. 7 is relatively simple and provides an effective mechanism for torque transmission between non-aligned shafts or for the conversion of eccentric rotation to concentric rotation. In this form, it is to be noted that one of shafts 412a and 412b is driven while the other is driving. Similarly, one of shafts 413a and 413b is driven and the other is driving. This form of the invention illustrates that either of the shafts 412a-412b and 413a-413b may be the driven or the driving shafts depending upon the particular design need. It is to be understood further that the ends of the shafts may be internally or externally threaded, or interconnected by other means, as may be needed. Further, the shafts may take various configurations as may be needed, provided the drive connection between the shafts is as described using the pin chambers and pins in the arrangement disclosed.

As previously pointed out, the universal ball joint of this invention is particularly adapted for use in those systems in which there is high torque transmission, as for example, in oil field uses, although the present invention is not limited to such uses as will be apparent to those skilled in the art. Due to the simplicity and the rugged nature of the design and the fact that the ball chamber may be sealed for lubricant, while including a bore for passage of fluid, the present invention finds special adaptability in the drilling industry.

Even though the invention has been described in terms of the embodiments which are set forth in detail, it should be understood that the disclosed forms are for the purpose of illustration and that the practice of the invention is not limited thereto. Alternate forms and embodiments will be apparent to those skilled in the art in view of this detailed disclosure. Thus, modifications are contemplated which can be made without departing from the scope and spirit of the described invention.

What is claimed is:

1. A universal ball joint for use between a driving and driven member and wherein there is essentially no axial movement between the two, and wherein in the neutral position of the members there is a central axis, comprising:
   first shaft means having spherical ball means on one end thereof, said shaft extending in a direction opposite of said ball means,
   second shaft means cooperating with said first shaft means and including receptacle means for receiving said ball means,
   said receptacle means including a plurality of spaced elongated axially extending grooves of arcuate cross section and of uniform depth along their axis and oriented in spaced parallel relation to said center axis,
   said ball means including a plurality of spaced elongated axially extending grooves of arcuate cross section and of uniform depth along their axis and oriented in spaced parallel relation to said center axis, and oriented in spaced parallel relation to said center axis,
   the grooves of said receptacle means and the grooves of said ball means cooperating to form a plurality of elongated axially extending chambers between said ball means and said receptacle means and which are oriented in spaced parallel relation to said center axis,
   means to maintain said shafts essentially axially fixed with respect to each other,
   pin means received in said chambers and forming a driving connection between said shafts,
   each of said pin means having substantially linear tapered surfaces extending from its midpoint to its end portions whereby there is relative arcuate movement between said shafts, and
   one of said shafts being driven and the other being a driving shaft.

2. An universal ball joint as set forth in claim 1 wherein said means to maintain said shafts essentially axially fixed comprises a retainer means cooperating with said second shaft means to maintain said ball means axially positioned in said receptacle means.

3. A universal ball joint as set forth in claim 2 wherein said retainer means surrounds at least a portion of said first shaft.

4. A universal ball joint as set forth in claim 3 wherein there is a seal element between said first shaft and said retainer means.

5. A universal ball joint as set forth in claim 1 wherein each of said pin means includes a relatively large radiused section between the tapered ends thereof.

6. A universal ball joint as set forth in claim 1 wherein said shafts include bore means therein such that there is a fluid passageway from one end of one shaft to the other end of the other shaft.

7. A universal ball joint as set forth in claim 1 wherein one of said shafts is attached to a drill string.

8. A universal ball joint as set forth in claim 1 wherein one of said shafts is a reamer/stabilizer.

9. A universal ball joint as set forth in claim 1 wherein one of said shafts includes a stabilizer.

10. A universal ball joint as set forth in claim 1 wherein the end of each of the shafts is threaded.

11. A universal ball joint as set forth in claim 1 wherein one of said shafts is connected to a second universal ball joint, said second universal ball joint including:
    first and second shaft means,
    one of said shafts including a housing and the other including a spherical ball element received in said housing,
    the opposed surfaces of said ball and said housing including a plurality of pin chambers therebetween, and
    pin means received in said chambers and forming a driving connection between the said first and second shafts of said second universal ball joint.

12. A universal ball joint as set forth in claim 11 wherein each of said shafts includes a bore therein for flow of fluid therethrough.

13. A universal ball joint as set forth in claim 11 wherein the driven shaft of the one of said universal ball joints is connected to the driving shaft of the second universal ball joint.

14. A universal ball joint as set froth in claim 13 wherein the connected shafts are solid.

15. A universal ball joint assembly including at least two universal ball joints as defined in claim 1.

16. A universal ball joint of the type described, comprising:
    first and second shaft means,
    one of said shafts including a housing and the other including a ball member received within said housing,
    retainer means received in said housing and operative to maintain said ball member fixed axially in said housing,
    bearing means supported by said housing and cooperating therewith to support the portion of the ball remote from the shaft to which it is affixed,
    said retainer including a conical bore through which the shaft attached to said ball passes,
    each of said ball and housing including axially extending grooves arranged in facing relation and forming a plurality of spaced chambers therebetween,
    each of said chambers receiving a driving pin each end of which is tapered by a predetermined amount,
    second bearing means, spaced from said first, and positioned between said retainer means and said ball element to form a support for said ball element,
    said driving pins forming the driving connection between said shafts and the degree of taper thereof being related to the relative articulation between said shafts, and
    seal means positioned between said retainer means and the shaft which passes through said retainer means to effect a seal in all positions of the said shaft relative to said retainer means.

17. A universal ball joint as set forth in claim 16 wherein each of said shafts includes a bore for flow of fluid through said universal ball joint.

18. A universal ball joint as set forth in claim 17 wherein the shaft which includes said housing is a mill tool which receives said retainer means.

19. A universal ball joint as set forth in claim 17 wherein said shaft which includes said housing is a stabilizer and wherein said retainer means forms part of said stabilizer.

20. A universal ball joint as set forth in claim 19 wherein a reamer is provided on the end of said stabilizer.

21. A universal ball joint assembly including at least two universal ball joints as set forth in claim 16.

22. A universal ball joint assembly including at least two universal ball joints as set forth in claim 17.

23. A universal ball joint for use between a driving and driven member and wherein there is essentially no axial movement between the two, and wherein in the neutral position of the members there is a central axis comprising:

first shaft means having spherical ball means on one end thereof, said shaft extending in a direction opposite of said ball means, second shaft means cooperating with said first shaft means and including receptacle means for receiving said ball means, said receptacle means including a plurality of spaced elongated axially extending grooves of arcuate cross section and of uniform depth along their axis and oriented in spaced parallel relation to said center axis, said ball means including a plurality of spaced elongated axially extending grooves of arcuate cross section and of uniform depth along their axis and oriented in spaced parallel relation to said center axis, and oriented in spaced parallel relation to said center axis, the grooves of said receptacle means and the grooves of said ball means cooperating to form a plurality of elongated axially extending chambers between said ball means and said receptacle means and which are oriented in spaced parallel relation to said center axis, means to maintain said shafts essentially axially fixed with respect to each other, said means comprising: a retainer means cooperating with said second shaft means to maintain said ball means axially positioned in said receptacle means, said retainer means surrounding at least a portion of said first shaft, said retainer means including a conical bore whose taper is less than the maximum relative arcuate movement between said shafts, pins means received in said chambers and forming a driving connection between said shafts, each of said pin means being tapered a predetermined amount whereby there is relative arcuate movement between said shafts, and one of said shafts being driven and the other being a driving shaft.

24. A universal ball joint for use between a driving and driven member and wherein there is essentially no axial movement between the two, and wherein in the neutral position of the members there is a central axis comprising:

first shaft means having spherical ball means on one end thereof, said shaft extending in a direction opposite of said ball means, second shaft means cooperating with said first shaft means and including receptacle means for receiving said ball means, said receptacle means including a plurality of spaced elongated axially extending grooves of arcuate cross section and of uniform depth along their axis and oriented in spaced parallel relation to said center axis, said ball means including a plurality of spaced elongated axially extending grooves of arcuate cross section and of uniform depth along their axis and oriented in spaced parallel relation to said center axis, and oriented in spaced parallel relation to said center axis, the grooves of said receptacle means and the grooves of said ball means cooperating to form a plurality of elongated axially extending chambers between said ball means and said receptacle means and which are oriented in spaced parallel relation to said center axis, means maintain said shafts essentially axially fixed with respect to each other, pin means received in said chambers and forming a driving connection between said shafts, said pin means constructed of a material which wears before the material of the ball;

each of said pin means being tapered a predetermined amount whereby there is relative arcuate movement between said shafts, and one of said shafts being driven and the other being a driving shaft.

25. A universal ball joint for use between a driving and driven member and wherein there is essentially no axial movement between the two, and wherein in the neutral position of the members there is a central axis comprising:

first shaft means having spherical ball means on one end thereof, said shaft extending in a direction opposite of said ball means, second shaft means cooperating with said first shaft means and including receptacle means for receiving said ball means, second shaft means cooperating with said first shaft means and including receptacle means for receiving said ball means, at least one of said first and second shafts including a reamer, said receptacle means including a plurality of spaced elongated axially extending grooves of arcuate cross section and of uniform depth along their axis and oriented in spaced parallel relation to said center axis, said ball means including a plurality of spaced elongated axially extending grooves of arcuate cross section and of uniform depth along their axis and oriented in spaced parallel relation to said center axis, and oriented in spaced parallel relation to said center axis, the grooves of said receptacle means and the grooves of said ball means cooperating to form a plurality of elongated axially extending chambers between said ball means and said receptacle means and which are oriented in spaced parallel relation to said center axis, means to maintain said shafts essentially axially fixed with respect to each other, pin means received in said chambers and forming a driving connection between said shafts, each of said pin means tapered a predetermined amount whereby there is relative arcuate movement between said shafts, and one of said shafts being driven and the other being a driving shaft.

26. A universal ball joint for use between a driving and driven member and wherein there is essentially no axial movement between the two, and wherein in the neutral position of the members there is a central axis comprising:
- first shaft means having spherical ball means on one end thereof, said shaft extending in a direction opposite of said ball means,
- second shaft means cooperating with said first shaft means and including receptacle means for receiving said ball means,
- second shaft means cooperating with said first shaft means and including receptacle means for receiving said ball means, at least one of said first and second shafts includes a mill tool,
- said ball means including a plurality of spaced elongated axially extending grooves of arcuate cross section and of uniform depth along their axis and oriented in spaced parallel relation to said center axis, and oriented in spaced parallel relation to said center axis,
- the grooves of said receptacle means and the grooves of said ball means cooperating to form a plurality of elongated axially extending chambers between said ball means and said receptacle means and which are oriented in spaced parallel relation to said center axis,
- means to maintain said shafts essentially axially fixed with respect to each other,
- pin means received in said chambers and forming a driving connection between said shafts,
- each of said pin means tapered a predetermined amount whereby there is relative arcuate movement between said shafts, and
- one of said shafts being driven and the other being a driving shaft.

* * * * *